April 19, 1960     H. E. RYDER, JR     2,933,290

RACK SHAFT LOCKING MEANS

Filed July 3, 1958

INVENTOR.
HAROLD E. RYDER JR.

BY *Harry M. Saragovitz*

ATTORNEY

United States Patent Office

2,933,290
Patented Apr. 19, 1960

2,933,290

RACK SHAFT LOCKING MEANS

Harold E. Ryder, Jr., Long Branch, N.J.

Application July 3, 1958, Serial No. 746,572

1 Claim. (Cl. 255—22)

(Granted under Title 35, U.S. Code (1952), sec. 266)

The invention described herein may be manufactured and used by or for the Government for governmental purposes, without the payment of any royalty thereon.

The present invention relates to a locking means. In particular the invention has specific utility as a means for locking a rectangular, or any form of non-circular drive shaft such as a rack shaft. Such shafts usually have spaced teeth on one surface thereof which engage a drive pinion to actuate longitudinal movement of the shaft.

One specific form of equipment utilizing a rectangular drive rack shaft of the kind set forth above is a post hole earth boring machine and the invention herein will be described in its application to such a device. Such machines are shown and described in unclassified Department of the Army Technical Manuals TM 9–8022 "Earth Boring Machine And Pole Setter Truck" and TM 11–2262 "Open Wire Pole Line Construction." Earth boring machines of the kind adapted to dig holes from 16" to 20" in diameter and to a depth of about 7 feet comprise essentially a housing, a rack shaft having teeth along one surface thereof extendable through the housing, a drive pinion operated through a gear train which engages the shaft to effect longitudinal movement thereof, and an auger secured to one end of the rack shaft. Other essential components of such machines include a rubber ring and a coil spring positioned intermediate the auger and a nut that secures several wear plates that lie beneath the main housing. The purpose of such spring assembly is to absorb or take up any shock or undue strain upon the machine during its operation. Also included as an essential part of the machine is a locking device comprising a spring loaded pawl which engages the teeth of the rack shaft. Such locking means is enclosed in the housing and provided with a suitable means for rendering the rack shaft inactive or non-operable during normal digging operations. The primary functions of the locking means, i.e., the pawl which when engaged will permit only inward retraction of the rack shaft, are (1) to prevent outward extension of the rack shaft during transit of the machine, and (2) to prevent outward extension of the shaft during the raising of the machine from its horizontal position to its operating position.

It has been found that in the utilization of an earth boring machine of the kind described above, one drawback has often reoccurred to prevent smooth and efficient operation of the machine. Such happening occurs after a post-hole has been dug and it is desired to retract the machine from its operating position to its travelling position. At such time it is necessary to retract the rack shaft and quite often this operation results in the rack locking means becoming jammed and impossible to disengage by the small hand control handle provided for such a purpose. Such jamming occurs as the drive pinion urges the rack shaft upwardly compressing the coil spring until it is unduly compressed. Such full and undue compression can occur if the pawl of the rack lock drops into an interdental space when the spring and rubber bumper are fully compressed. In the event of such jamming it is necessary that the auger portion be taken off to remove the tension of the spring or to ram or force the auger against a firm object such as a heavy tree stump to further a slight upward longitudinal movement to allow the pawl to be disengaged from the particular space in which it is held and thereby allow its release by the hand operated pawl releasing mechanism.

The primary object of the present invention is to provide a means for locking a rack shaft, of conventional non-circular configuration.

An important feature of the invention lies in the elimination of any possibility of jamming the rack shaft, an event common in raising such rack shaft upwardly within its housing.

Other objectives and features of the locking means in its application to an earth boring machine in particular will be apparent from the following description to be read in view of the accompanying drawing in which.

Figure 1:
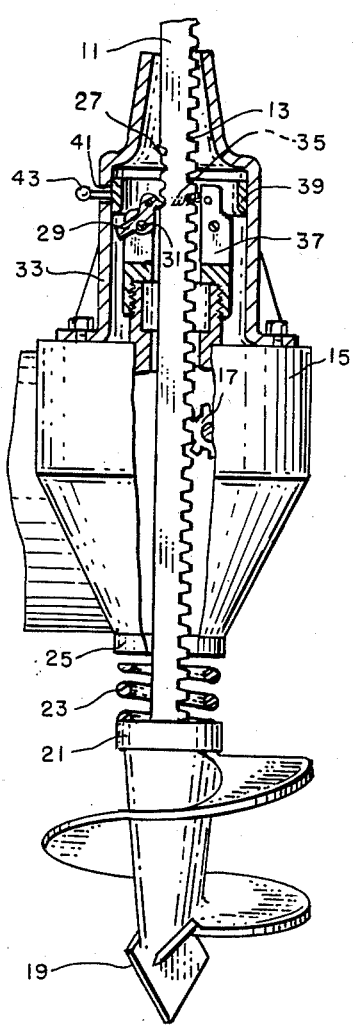
Fig. 1 shows, in part, an earth boring machine partly in section, and partly in perspective and showing the machine in locked position.

In the particular embodiment of the invention described herein its use will be shown as applied to an earth boring machine. However, in the description herein only those component parts of such machine have been shown that are necessary to describe the locking means forming the invention herein.

Referring to the drawing, the earth boring machine includes in part, a rack shaft 11 of rectangular configuration and having continuous gear teeth 13 on one surface thereof.

From an inspection of the drawing, it is readily apparent that many component parts of the earth boring machine, such as power driving means, supports and frameworks have been omitted so as not to encumber the more essential parts necessarily shown for a clearer description of the invention. The rack shaft 11 is supported by and travels within a casing 15 which in turn is supported by and secured to the vehicle on which the machine is carried. Confined within the casing 15 is a drive pinion 17 which serves as a driving gear for effecting longitudinal movement of the shaft 11 within and through the casing 15. The pinion 17 is driven by appropriate gearing through a power source (not shown). To the working end, as distinguished from the free end, of the rack shaft 11 is affixed an auger 19. Serving as a shock absorbing medium for the auger is a shock absorber assembly intermediate the auger and the casing. Such assembly includes a rubber bumper 21 and a spiral spring 23 positioned between the auger and a nut 25 which serves to confine a plurality of wear plates. In addition to the components described immediately above, which constitute in main the essential components of an earth boring machine, such machines include a means for locking the shaft when the shaft is elevated from the ground after completion of a task. Such locking means usually comprise a pawl having its tongue portion engageable in the gear teeth 13. Thus, it is apparent as the shaft 13 was raised, such pawl would successively engage the gear teeth to prevent any downward slippage of the shaft. If the shaft was unduly raised the bumper 21 and spring 23 would jam and considerable effort and time would be required to free the shaft so that it could be put into use again as hereinbefore described.

Figure 2:
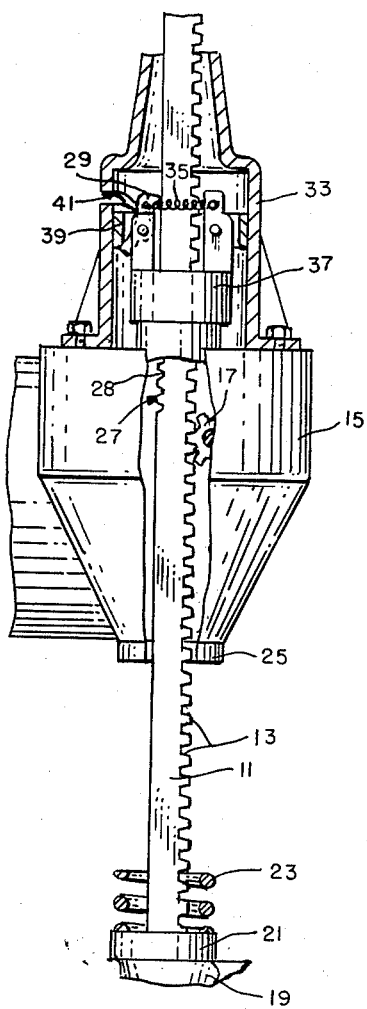
Fig. 2 shows in cross-section, a view of the machine of Fig. 1 in its normal operating position.
Figure 3:
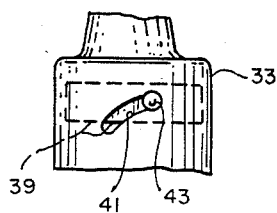
Fig. 3 is a fragmentary view of one detail of the locking means.

The present invention seeks to alleviate such occurrences by reorientating the pawl from its conventional position of engagement with the teeth 13 as described above. The manner in which this is accomplished is shown in Figs. 1 and 2. Referring to said figures it can be seen that the shaft 11 is provided, on the face opposite to that having the gear teeth 13, with a relatively short series of teeth 27 forming a row of interdental spaces 28. In similar fashion the pawl 29 is relocated as shown, to be in position to mesh or engage the spaces 28 between the teeth 27. The pawl 29 is pivotably mounted on a shaft 31. The pawl assembly is confined in a housing 33 which is bolted to the main housing 15. For urging the pawl 29 into meshing engagement with the teeth 27 a spring 35 is provided, one end of which is secured to the pawl while its other end is secured to a member 37.

When the machine is in position such as shown in Fig. 1 the rack shaft 11 is locked. To release the shaft from such position there is provided a ring 39 having a spiral slot 41. Secured to the ring 39 and extending through the slot 41 is an operating handle 43. In the particular embodiment shown only one slot and handle are shown, however it is obvious that a plurality of such spiral slots and coacting handles may be provided.

To describe the manner in which the ring 39 operates reference is made to Fig. 1. In such view, the rack shaft is shown in locked position and at such time the machine can be elevated to its horizontal position. In such locked position the pawl 29 is in engagement within one of the spaces 28 between the teeth 27 by initial urging of the spring 35 and the downward force of the machine. When it is desired to disengage the locking pawl 29 from its engaged position the handle 43 is moved downwardly in the spiral slot 41. Such movement of the handle will effect rotation and downward movement of the ring 39 at which time the side wall portion of the ring will engage the free end of the pawl and urge the pawl out from its locked position and maintain it in such unlocked position as long as desirable.

The location of the teeth 27 on the rack is critical in the following respect. Since it is desirable to prevent any jamming of the spring assembly between the auger and the housing, locking of the rack shaft should be accomplished before such jamming can take place. This can be prevented by having the lowermost of the teeth 27 so spaced from the bottom of the shaft that as the shaft is elevated engagement of the pawl 29 and the last spaced tooth will be such that there still will be some slight spacing and play within the spring assembly. It is to be noted that since the shaft beneath the teeth 28 presents a smooth surface, the pawl 29 will not become engaged but ride along such smooth surface if the rack shaft is raised beyond the last or lowermost interdental space.

While there has been shown and described above the preferred structure in which the principles of this invention have been embodied, it is to be understood that the invention is not to be limited to the specific details shown and described. Thus, for example, in the particular example herein, the interdental spaces 28 have been shown on the surface of the rack shaft opposite to that of the main gear drive teeth, it is, however, apparent that the spaces 28 could be formed on any of the other surfaces of the rack shaft.

What is claimed is:

In an earth boring machine including a housing, a rack shaft having upper and lower ends and gear teeth on one complete side surface thereof geared with a pinion or the like for driving said shaft through said housing and having an auger secured to the said lower end of the rack shaft and a shock assembly including an absorbent bumper and a spring intermediate the auger and the housing, the improvement comprising means for preventing the jamming of said shock assembly by a locking means for the shaft including a pawl supported in said housing and engageable in a series of interdental spaces formed on a relatively minor portion on another side surface of the rack intermediate the pawl and the auger whereby the greater portion of said another side presents a smooth surface and wherein the lowermost of said interdental spaces is so spaced from the absorbent bumper whereby when said pawl is in the lowermost internmental space there will be a slight slackness in the spring of the shock assembly.

References Cited in the file of this patent
UNITED STATES PATENTS

| | | |
|---|---|---|
| 1,031,194 | Murdick et al. | July 2, 1912 |
| 1,887,172 | Smith et al. | Nov. 8, 1932 |
| 2,738,164 | Bailey | Mar. 13, 1956 |

FOREIGN PATENTS

| | | |
|---|---|---|
| 315,026 | Great Britain | July 11, 1929 |